United States Patent [19]

DeForest, III

[11] Patent Number: 5,086,805

[45] Date of Patent: Feb. 11, 1992

[54] SELF-FILLING POTPOURRI APPARATUS

[76] Inventor: Richard L. DeForest, III, 1100 N. Plum Grove Rd. π108, Schaumburg, Ill. 60173

[21] Appl. No.: 640,619

[22] Filed: Jan. 14, 1991

[51] Int. Cl.⁵ .............................................. A01K 7/00
[52] U.S. Cl. .................................. 137/341; 126/390; 119/72.5; 119/73; 219/433
[58] Field of Search ............... 219/432, 433; 126/373, 126/390; 392/441; 137/341, 513.5; 119/72.5, 73, 72

[56] References Cited

U.S. PATENT DOCUMENTS

| | | | |
|---|---|---|---|
| 3,771,496 | 11/1973 | Atchley | 119/72.5 |
| 3,789,800 | 2/1974 | Steudler, Jr. | 119/72 |
| 3,797,513 | 3/1974 | Hazen | 137/132 |
| 4,256,950 | 3/1981 | Wildgruber | 119/73 |
| 4,629,866 | 12/1986 | Proctor | 126/390 |

FOREIGN PATENT DOCUMENTS

| | | | |
|---|---|---|---|
| 701034 | 3/1931 | France | 126/390 |
| 76534 | 1/1918 | Switzerland | 126/390 |
| 114610 | 4/1918 | United Kingdom | 126/390 |
| 541204 | 1/1932 | United Kingdom | 126/390 |

*Primary Examiner*—A. Michael Chambers
*Attorney, Agent, or Firm*—Leon Gilden

[57] ABSTRACT

A unitary housing mounts a container upon a thermostatically controlled heating grid to provide low-level heat to potpourri components positioned within the container. An overlying reservoir integrally mounted to the base includes a drip feed organization to provide constant and metered flow of fluid to the container to maintain a desired moisture level within the container in use. The container is formed with rib structure to maintain convection curves within the container to enhance thorough heating of the potpourri components contained therewithin.

1 Claim, 4 Drawing Sheets

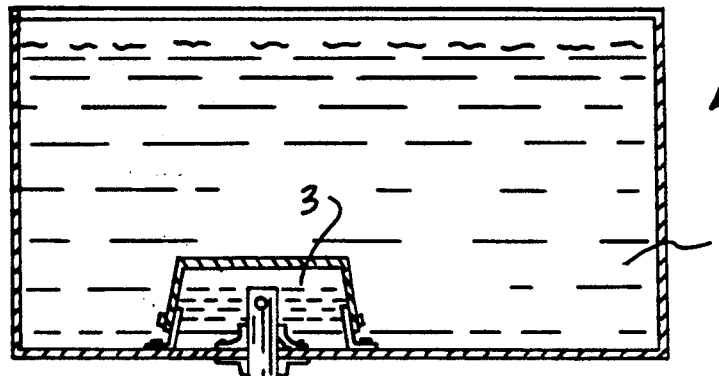
Fig. 1
PRIOR ART
Fig. 2
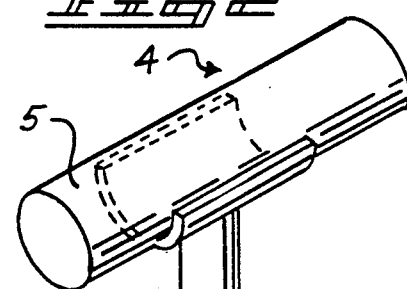
PRIOR ART

SELF-FILLING POTPOURRI APPARATUS

BACKGROUND OF THE INVENTION

1. Field of the Invention

The field of invention relates to container and fluid metering apparatus, and more particularly pertains to a new and improved self-filling potpourri apparatus wherein the same maintains desired fluid levels within a potpourri pot construction.

2. Description of the Prior Art

The use of potpourri pots to provide aromatic scent within a dwelling is arranged, wherein it is known to provide various fill structure associated with containers. The instant invention attempts to incorporate a heated potpourri pot construction utilizing relatively low heating levels below the boiling point of water to maintain aromatic currents within a dwelling or structure. Examples of prior art self-filling apparatus may be found in U.S. Pat. No. 3,797,513 to Hazen wherein an animal dosing organization utilizes an internal bell-shaped housing formed within a reservoir to maintain fluid flow to an outlet conduit.

U.S. Pat. No. 3,789,800 to Steudler, Jr. sets forth a watering system for poultry and the like for mounting to an associated fence grid structure.

U.S. Pat. No. 2,790,417 to Brembeck; U.S. Pat. No. 4,628,866 to Israel, et al. each set forth various animal watering feed systems.

The U.S. Pat. to Garbiel, No. 3,752,124, sets forth a fluid bottle formed with a cylindrical tube at its lower terminal end, with an enlarged semi-spherical head portion projecting from a lowermost plastic tube, including a water outlet aperture accessible to a caged animal for drinking.

As such, it may be appreciated that there continues to be a need for a new and improved self-filling potpourri apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of self-filling pot apparatus now present in the prior art, the present invention provides a self-filling potpourri apparatus wherein the same utilizes a metered fluid conduit directed into the pot construction in association with a heating grid to effect heating of potpourri components contained within the container or pot construction. As such, the general purpose of the present invention, which will be described subsequently in greater detail, is to provide a new and improved self-filling potpourri apparatus which has all the advantages of the prior art self-filling fluid apparatus and none of the disadvantages.

To attain this, the present invention provides a unitary housing mounting a container upon a thermostatically controlled heating grid to provide low-level heat to potpourri components positioned within the container. An overlying reservoir integrally mounted to the base includes a drip feed organization to provide constant and metered flow of fluid to the container to maintain a desired moisture level within the container in use. The container is formed with rib structure to maintain convection curves within the container to enhance thorough heating of the potpourri components contained therewithin.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved self-filling potpourri apparatus which has all the advantages of the prior art self-filling fluid containers and none of the disadvantages.

It is another object of the present invention to provide a new and improved self-filling potpourri apparatus which may be easily and efficiently manufactured and marketed.

It is a further object of the present invention to provide a new and improved self-filling potpourri apparatus which is of a durable and reliable construction.

An even further object of the present invention is to provide a new and improved self-filling potpourri apparatus which is susceptible of a low cost of manufacture with regard to both materials and labor, and which accordingly is then susceptible of low prices of sale to the consuming public, thereby making such self-filling potpourri apparatus economically available to the buying public.

Still yet another object of the present invention is to provide a new and improved self-filling potpourri apparatus which provides in the apparatuses and methods of the prior art some of the advantages thereof, while simultaneously overcoming some of the disadvantages normally associated therewith.

Still another object of the present invention is to provide a new and improved self-filling potpourri apparatus wherein the same incorporates directional ribs formed coextensively of an interior surface of the container apparatus to enhance circulatory convection current formed within a container to enhance even and thorough heating of potpourri components contained therewithin.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic view, partially in section, of a prior art water metering apparatus.

FIG. 2 is an isometric illustration of a further example of a prior art water metering apparatus.

DESCRIPTION OF THE PREFERRED EMBODIMENT

Figure 3:
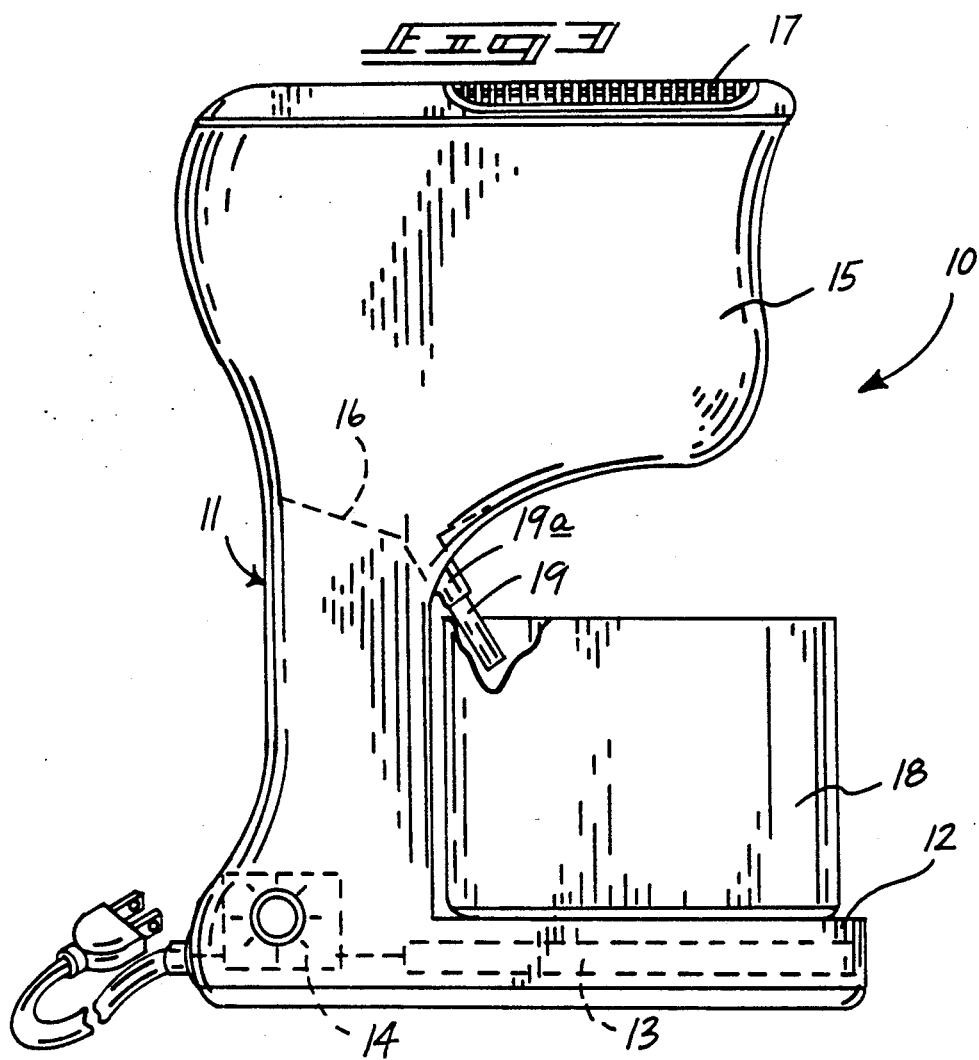
FIG. 3 is an orthographic side view, taken in elevation, of the instant invention.
Figure 4:
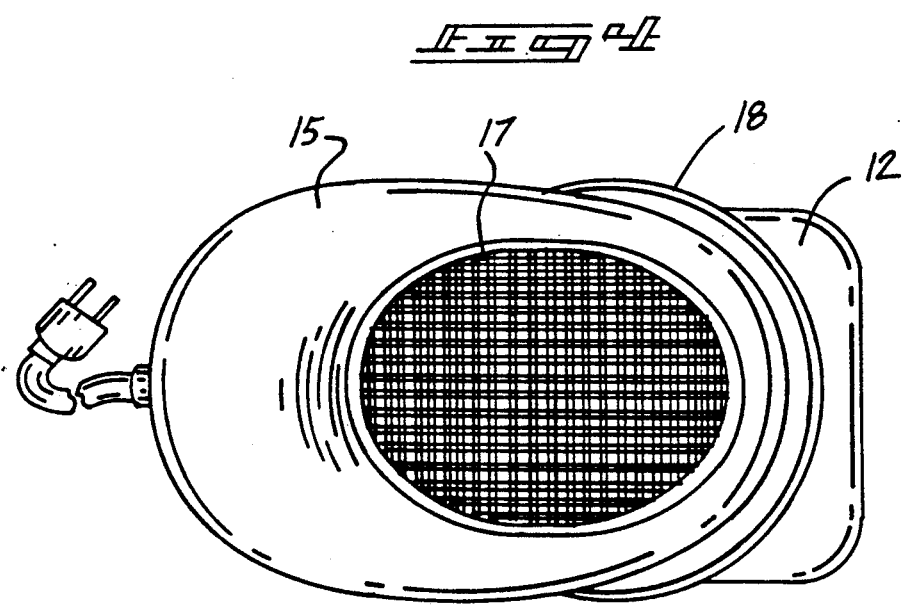
FIG. 4 is a top orthographic view of the instant invention.

With reference now to the drawings, and in particular to FIGS. 1 to 9 thereof, a new and improved self-filling potpourri apparatus embodying the principles and concepts of the present invention and generally designated by the reference numeral 10 will be described.

FIG. 1 illustrates a prior art dosing organization 1, wherein a reservoir 2 includes a secondary housing 3 to direct fluid through an outlet conduit, in a manner as set forth in U.S. Pat. No. 3,797,513. U.S. Pat. No. 3,789,800 sets forth a construction 4, as illustrated in FIG. 2, of a water tube 5 directing water through a conduit 6 to an underlying container, wherein the organization is arranged for mounting to an associated fence structure, as set forth in that patent in the feeding of poultry and the like.

Figure 5:
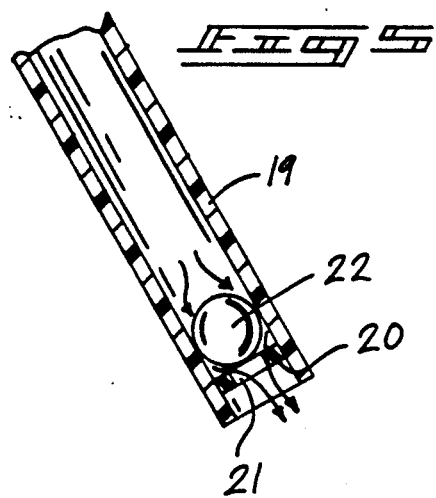
FIG. 5 is a cross-sectional illustration of the metering tube construction of the instant invention.
Figure 6:
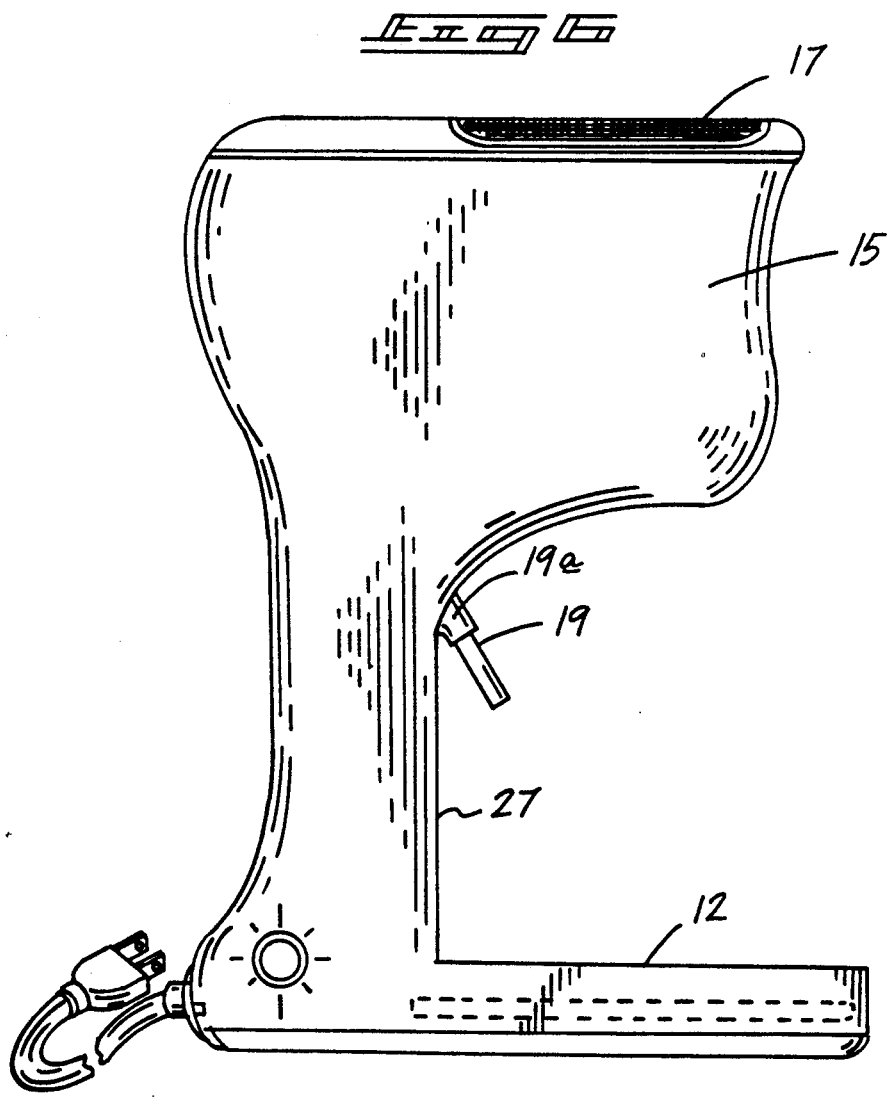
FIG. 6 is an orthographic side view, taken in elevation, of the instant invention with the container removed therefrom.

More specifically, the self-filling potpourri apparatus 10 of the instant invention essentially comprises a unitary housing 11 including a horizontally oriented planar heated support platform 12, with a heating member 13 (such as a resistance heater) operative through a thermostat 14 and electrical connection extending exteriorly of the housing 11 to maintain a constant heat directed to the platform 11, typically between 100 and 180 degrees F. This level of heating prevents boiling of fluid such as water within an overlying container 18 that typically mounts various potpourri components therewithin for use throughout a dwelling. A fluid reservoir 17 is integrally mounted to the housing 11 to overlie the container 18 that includes an interior reservoir concave floor 16 directing fluid from within the reservoir to a flexible fill tube 19 projecting interiorly of the container 18. The flexible fill tube 19 permits convenience of positioning of the container 18 underlying the fill tube 19, wherein the fill tube 19 is in fluid communication with a rigid fill tube alignment conduit 19a in unitary construction with the housing 11. A screen fill opening 17 permits directing of fluid into the reservoir 15. Reference to FIG. 5 illustrates the flexible fill tube 19, including a fill tube floor 20, with at least a single aperture 21 directed therethrough, wherein the fill tube includes a check ball 22 overlying the aperture 21, with the check ball 22 sized by a diameter less than that of the interior of the fill tube 19 to permit metered fluid flow about the check ball 22 and permit seepage thereabout through the aperture 21 for constant filling of the container 18.

Figure 7:
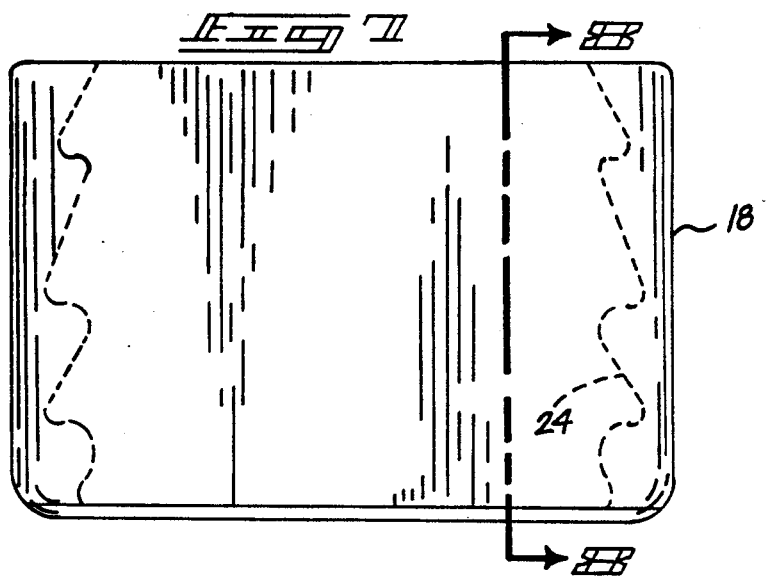
FIG. 7 is an orthographic side view of the container construction of the instant invention.
Figure 8:
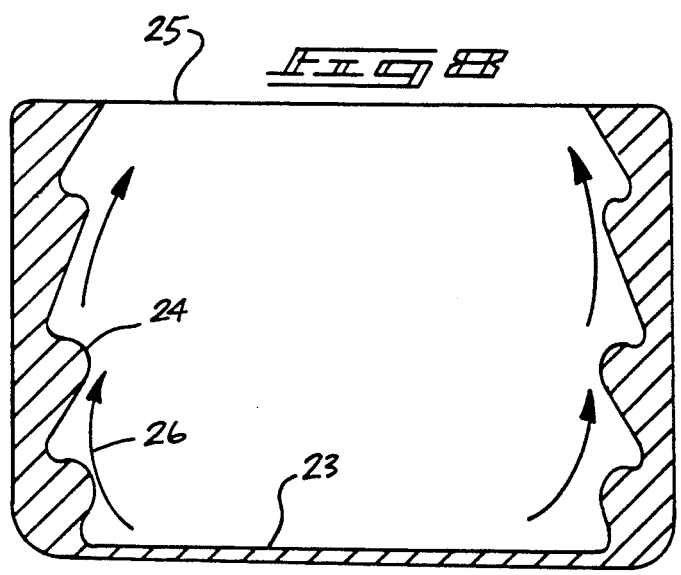
FIG. 8 is an orthographic view, taken along the lines 8—8 of FIG. 7 in the direction indicated by the arrows.
Figure 9:
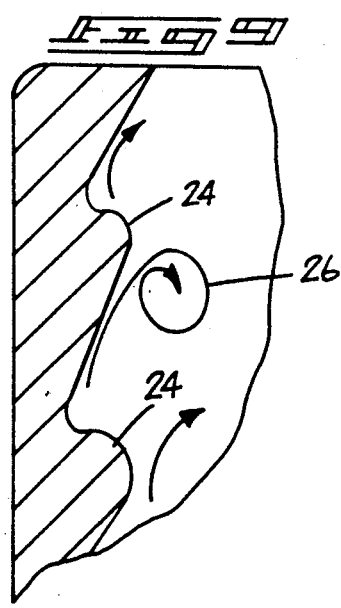
FIG. 9 is an enlarged side view of the interior surface of the container construction.

Reference to FIGS. 7-9 illustrate details of the container 18, wherein the container includes a container floor 23 underlying an associated top opening 25. The annular walls of the container 24 include a ribbed wall surface 24 whose ribs are arranged parallel relative to one another and coextensively directed from the floor 23 to the top opening 25. In this manner, convection currents 26 generated within the container 18 are recirculated therewithin to enhance complete heating of the potpourri components contained within the container 18. In use, the container 18 is positioned within the unitary housing 11 in adjacency to a container positioning wall 27 positioned between the reservoir 15 and the platform 12.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A self-filling potpourri apparatus comprising,
a unitary housing arranged for conveience of positioning and transport, wherein the housing includes an underlying horizontal planar selectively heated support platform, the support platform overlying an elongate heating member, the heating member operated through a thermostat to maintain a preselected temperature within the heating member and the overlying support platform,
and
a fluid reservoir positioned above and integrally mounted relative to the support platform, with the fluid reservoir including a fill tube in fluid communication with the fill reservoir, with the fill tube projecting exteriorly of the fluid reservoir overlying the support platform,
and
a container selectively positionable upon the support platform and arranged to receive the fill tube therewithin,
and
wherein the fill tube is flexible to permit positioning within the container, and wherein the fill tube is mounted to a rigid fill tube conduit, with the fill tube conduit in fluid communication interiorly of the fluid reservoir, and the fluid reservoir including a concave floor to enhance directing of fluid into the fill tube and container,
and
including a vertical positioning wall between the reservoir and the support platform to align and position the container relative to the reservoir and support platform,
and
wherein the predetermined temperature is maintained between 100 and 180 degrees F.,
and
wherein the flexible fill tube includes a fill tube floor including at least a single aperture directed therethrough, with a check ball mounted within the fill tube overlying the aperture, and the check ball defined by a predetermined diameter and the fill tube defined by a predetermined internal diameter, wherein the predetermined diameter is less than the predetermined internal diameter to permit seepage of fluid about the check ball and through the aperture into the container to provide metered filling of the container,
and
wherein the container includes a container floor and an upper container opening overlying the floor, and the container includes an internal annular ribbed wall, the internal ribbed wall including a series of equally spaced parallel ribs projecting interiorly of the container to recirculate convection currents formed within the container to promote thorough heating of components contained within the container.

* * * * *